Patented Nov. 15, 1949

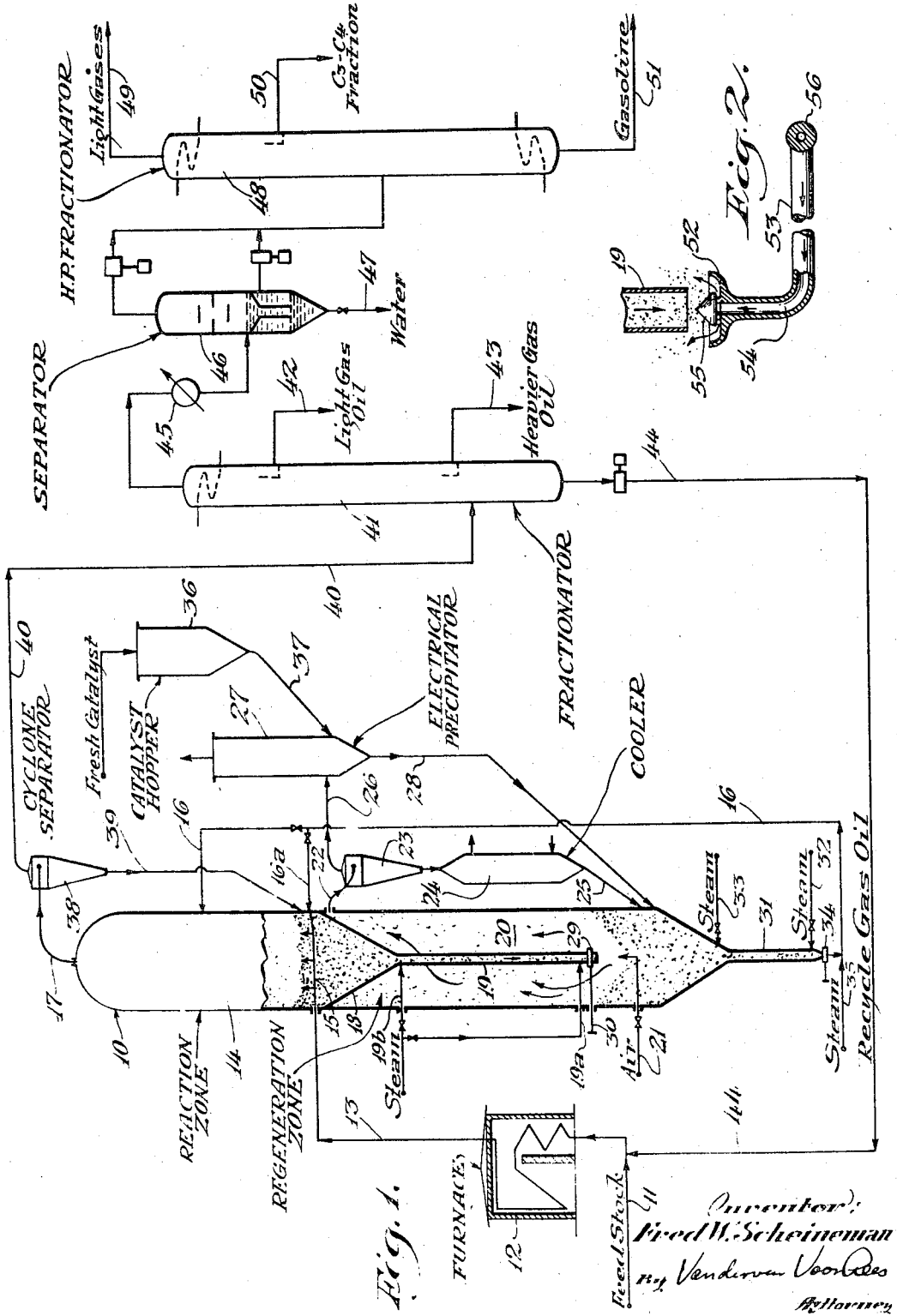

2,488,028

UNITED STATES PATENT OFFICE 2,488,028

CATALYTIC CONVERSION PROCESS AND APPARATUS THEREFOR

Fred W. Scheineman, Chicago, Ill., assignor to Standard Oil Company, Chicago, Ill., a corporation of Indiana Application May 10, 1941, Serial No. 392,848

16 Claims. (Cl. 196—52)

1

This invention relates to a method and apparatus for converting hydrocarbon oils by contacting the vapors thereof with porous, solid catalysts, in a subdivided condition, suspended in the vapors. One object of the invention is to provide a unitary apparatus for effecting contact between the hydrocarbon vapors and the catalyst in one zone and effecting regeneration of the catalyst in another zone by oxidation with air or other oxygen-containing gases. Another object of the invention is to provide an apparatus for converting hydrocarbons which will provide for heat exchange between the regeneration zone and the spent catalyst fed thereto. Still another object of the invention is to eliminate as far as possible the numerous contactors, separators and feeders employed heretofore in converting hydrocarbon oils with suspended catalysts, thereby reducing the energy required to transfer catalyst from zone to zone and facilitating the use of high catalyst-to-oil ratios.

Certain of the features of apparatus and operation herein set forth are separately described and claimed in the following applications: Page, Ser. No. 376,763, filed January 31, 1941; Gunness, Ser. No. 400,958, filed July 3, 1941; and applicant's continuation-in-part applications Ser. No. 400,956, filed July 3, 1941, and Ser. No. 440,566, filed April 27, 1942. Related applications include Johnson, Ser. Nos. 392,846–7, both filed May 10, 1941.

The invention is illustrated by a drawing which forms a part of this specification in which Figure 1 shows diagrammatically a unitary contacting and regenerating tower together with certain other accessories and controls, and Figure 2 shows a modified form of valve to be used in the apparatus of Figure 1 for controlling catalyst flow.

My process may be considered to be essentially a "two chamber process." Contacting and separation takes place simultaneously in the chambers and low pressure differentials prevail, making it easy to transfer catalyst by gravity or in gas suspension.

Referring to the drawing, tower 10 is a combined reaction zone and regeneration zone with separating zones for the catalyst within each of these. In operation, hydrocarbon oil feed stock, for example, gas oil, is charged by line 11 to furnace 12 where it is vaporized and the vapors are conducted at elevated temperature, e. g., 800 to 1050° F., through transfer line 13 leading to reaction zone 14 in the upper part of tower 10. The vapors may be admitted to the reaction zone by means of distributor 15.

The catalyst is introduced into the reaction

2 zone by line 16 and the catalyst particles tend to remain suspended in the "dense" zone of the reaction zone. Above the "dense" zone there is a "disperse" zone in which most of the catalyst separates and settles from the ascending vapor stream back to the "dense" zone. The hydrocarbon vapors are charged to the reaction zone at a sufficiently low rate to prevent the bulk of the catalyst from being carried out at the top of the reaction zone by outlet line 17. This rate may be about 0.5 to 5 feet per second (linear velocity), depending on the size of the catalyst particles, density of catalyst, etc. In general, the catalyst in reaction zone 14 will form a suspension whose density is about 10 to 25 pounds per cubic foot in the lower "dense" zone and 0.2 to about 5 pounds per cubic foot in the upper or "disperse" catalyst zone. The catalyst gradually deposits in the quiescent zone at the bottom of the reaction chamber and accumulates within the cone 18 in a semi-compact but free-flowing form. The apex of this cone communicates through duct 19 to a low point in the regeneration zone 20. A part of the catalyst is accordingly continually transferred from the reaction zone to the regeneration zone and is replaced by other catalyst entering the reaction zone through line 16. Free flow of catalyst through duct 19 is assured by the introduction of aeration gas such as steam at 19a and 19b. This aeration gas also serves as a stripping medium to remove hydrocarbon vapors from the catalyst.

In regeneration zone 20, carbon accumulated by the catalyst is burned off by means of a current of oxygen-containing gases, for example, air, admitted by line 21. This reaction is highly exothermic and various means may be employed to control the temperature. It is generally desirable to maintain the temperature within the regeneration zone at about 1000° F. Gases leaving the upper part of the regeneration zone by line 22 are conducted to cyclone separator 23 where most of the "carry over" catalyst is removed and returned to the base of the regeneration zone through cooler 24 and line 25. In cooler 24 sufficient heat is abstracted from the hot catalyst to materially assist in controlling the temperature of the regeneration zone. Spent regeneration gases leaves the cyclone by line 26 and may be further subjected to electrical precipitation or other separation to recover the remaining catalyst suspended therein which has escaped the cyclone 23. For this purpose an electrical precipitator may be used as shown at 27 and the catalyst recovered by this means may be returned by line 28 to regeneration zone 20. Fresh or regenerated catalyst may of course be mixed with the "fines" recovered in the precipitator to facilitate handling and any suitable pressuring or injecting means (not shown) may be employed for returning the fines to the system. If desired, cooling coils (not shown) may be installed in regenerator 20 to carry away part of the heat of regeneration. Such coils may contain water, diphenyl, mercury or other fluid conductor of heat which may be employed without decomposition at the elevated temperatures above mentioned.

Inasmuch as gravity flow is employed for conducting the spent catalyst into the regeneration zone through standpipe 19, it is important that the pressure in the bottom of this standpipe be at least 4 or 5 pounds higher than the pressure in the regenerator at the base of the standpipe. The pressure in the bottom of standpipe 19 is the sum of the pressure at the top of the reactor plus the pressure head of catalyst in the reactor plus the pressure head of catalyst in the standpipe. Thus with a reactor about 30 feet high with a top pressure of about 6 pounds the catalyst head in the reactor may be about 4 pounds and the catalyst head in the standpipe about 8 pounds giving a total pressure in the base of the standpipe of about 18 pounds per square inch. The pressure in the regenerator at the base of the standpipe should, in this case, not be greater than 13 or 14 pounds per square inch. Higher regenerator pressures may be used by using higher pressures in the reactor, a greater catalyst head in the reactor or a longer standpipe.

Spent catalyst is introduced from the standpipe into the regenerator through valve 29 controlled by external manual or automatic control means 30 and I prefer to provide means for automatically closing this valve when the pressure in the base of the standpipe is not at least 4 or 5 pounds greater than the pressure at this point in the regenerator.

Regenerated catalyst which settles out below the dense phase turbulent zone in regenerator 20 flows downwardly in standpipe 31 wherein it is aerated by steam or other inert gas introduced through line 32. Additional aeration gas may, of course, be introduced above the regenerator bottom through line 33 by means of suitable distributing means. This steam or aerating gas not only maintains the catalyst in fluent condition but it serves to strip out oxygen-containing gases from the catalyst.

Catalyst from the base of standpipe 31 is discharged by valve or star feeder 34, picked up with steam introduced through line 35 and conveyed by line 16 back to the reactor 14. In the drawing I have illustrated the introduction of catalyst into an intermediate or upper point in the reaction zone. This may accomplish a countercurrent treating effect in the reactor. It should be understood, however, that the catalyst may be introduced at about the same point at which reaction vapors are introduced and I may use the reaction vapors themselves for carrying the regenerated catalyst to the reactor by introducing charging stock vapors through line 35 and injecting the mixture of reaction vapors and catalyst upwardly in the reactor through line 16a and distributor 15. It is only necessary that the pressure at the bottom of standpipe 31 be 4 or 5 pounds higher than the pressure of steam or vapors introduced through line 35 and that the pressure of vapors in line 35 be sufficient to conduct the suspended catalyst to the reactor. Fresh catalyst may be introduced into the system at almost any point but I prefer to introduce it with electrically precipitated fines as hereinabove described. In other words, fresh catalyst from hopper 36 may be introduced by line 37 into the base of precipitator 27 and returned by line 28 to a body of regenerated catalyst.

Vapors withdrawn from the reaction zone 14 by line 17 are passed through a cyclone separation zone 38 and the catalyst recovered therein is returned by line 39 to the lower part of reactor 14. The cyclone separation zone may be a multistage system mounted outside of the reactor or inside of the reactor as described in my U. S. Letters Patent No. 2,337,684 entitled "System for recovering finely divided solids from gases." Reaction vapors from cyclone separation zone 38 are then conducted by line 40 to a fractionation system diagrammatically illustrated by fractionating tower 41 from which gas oil side streams may be withdrawn through lines 42 and 43 and from which a bottoms fraction may be withdrawn through line 44 and recycled with the feed stock in line 11. The overhead from tower 41 may be passed through cooler 45 to a separator 46 from which water may be withdrawn through line 47. The gaseous and liquid hydrocarbons from the separator may then be introduced into one or more high pressure fractionation systems diagrammatically illustrated by column 48 from which light gases are taken overhead through line 49, a C3—C4 fraction through line 50 and a gasoline fraction through line 51.

Instead of employing the simple slide valve in standpipe 19 as illustrated in Figure 1, I may employ a catalyst flow regulator as described in my U. S. Letters Patent No. 2,337,684 or I may employ a catalyst flow regulator as illustrated in Figure 2. The dish shaped cap 52 is supported on a movable arm 53 or on other means for raising and lowering it toward or away from the lower end of standpipe 19. A channel 54 leads through the center of the dish shaped cap to a deflecting head 55 which directs a current of gas from the channel downwardly into the dish thereby sweeping the dish free of catalyst which may fall into it. The cross-sectional area of the head 55 should be nearly the same as the cross-sectional area of the outlet from standpipe 19 in order to provide a support for the catalyst in the standpipe. The rate of catalyst flow is regulated by controlling the space between the outlet of standpipe 19 and dish shaped cap 52. When it is desired to stop the catalyst flow entirely the dish shaped cap 52 is forced upwardly against the outlet. In this position gas flowing through channel 54 may enter the standpipe 19 and travel upwardly therethrough, aerating the catalyst in the standpipe and maintaining it in free flowing condition. The gas employed in channel 54 may be dry steam, flue gas or other suitable inert gas. The arm 53 may be attached to hollow shaft 56 which may extend through the wall of tower 10 to external control means.

For catalytic cracking of gas oils I may employ catalysts of the silica-alumina or silica-magnesia type. Such a catalyst may be prepared by the acid treating of natural clays, such as bentonite, or by incorporating a metal oxide, such as alumina, magnesia, thoria, zirconia, etc. with activated silica. One method of preparing a catalyst is by ball-milling silica hydrogel with alumina or magnesia using about 2 to 30% of alumina or magnesia. The ball-milled dough may be dried at about 240° F. and then activated by heating to a temperature of about 900 to 1000° F. No invention is claimed in the composition or preparation of the catalyst per se and it is, therefore, unnecessary to describe the catalyst in further detail.

The catalyst may be in powdered form with a particle size of about 10 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. The vertical gas or vapor velocity in my reactor and regenerator for this finely divided catalyst may be about 1 to 5, usually about 1½ to 2½ feet per second in order to maintain the desired dense turbulent suspended catalyst phase above the point of fluid inlet in the reactor and regenerator respectively. Higher gas or vapor velocities may be required for coarser catalyst particles. For catalytic cracking of most charging stocks the temperature in the reactor should be about 850 to 950° F. and the weight ratio of catalyst introduced through line 16 to oil introduced through line 13 should be about 1:1 to 10:1, for example about 4:1. This ratio varies with the character of the catalyst and the oil treated and a feature of my system is the facility with which catalyst-to-oil ratios may be varied for controlling the amount of conversion in the reactor. The vapor contact time in the reactor may be about 10 or 15 seconds and the catalyst residence time in the reactor may be varied throughout a relatively wide range depending on the catalyst-to-oil ratios employed. Usually catalyst residence time will be about 1 to 10 minutes or more. The space velocity may be about 1 or 2 volumes of liquid oil charged per hour per volume of compacted catalyst in the reaction zone (assuming the catalyst has settled and come to rest) although space velocity may be as low as .25 or as high as 8 or 10.

By the use of my unitary apparatus having low pressure differentials and substantially the same pressures in the regeneration zone and the reaction zone respectively I can easily operate with high catalyst-to-oil ratios at a very low cost. By using high catalyst-to-oil ratios I not only obtain better conversion by use of fresher catalyst but I store enough heat in the catalyst in the regeneration zone to supply substantially all of the heat required by the endothermic reaction in the conversion zone. By employing a bottom catalyst draw-off in both the reactor and regenerator and thus superimposing the pressure in these zones on the standpipes depending from said zones I have provided an extremely compact system which does not require the extremely high standpipes and complicated separation systems heretofore deemed necessary in operations of this character. Great savings are effected not only in capital investment costs but in operating costs, and I obtain remarkable flexibility of operation and ease of control.

While I have illustrated my invention by showing a reactor superimposed above a regenerator it should be understood that the regenerator may be superimposed above the reactor or that the regenerator and the reactor may be mounted side by side. In any case, the centrifugal separation systems for recovering catalyst may be of the type generally described in my U. S. Letters Patent No. 2,337,684.

The use of coarser catalyst material of relatively uniform size will, of course, decrease the load on the centrifugal separation systems. Thus instead of employing catalyst of about 300 to 400 mesh I may use catalyst having a particle size of about 100 to 200 mesh or even as large as 100 or 50 mesh. A highly desirable dense turbulent suspended catalyst phase is obtained, however, with catalyst particles of about 200 to 400 mesh.

My invention is not limited to the catalytic cracking of gas oils but it may also be employed for the conversion of low knock rating naphthas into high knock rating gasolines. For this purpose the entire system may be operated under higher pressures, i. e., pressures of about 50 to 450 pounds per square inch and the catalyst may be chromium oxide, tungsten oxide, vanadium oxide, or the like mounted on activated alumina. In this system the reaction may be conducted in the presence of hydrogen or recycle gas supplied to the reaction zone along with charging stock vapors.

While I have described a specific example of my invention, specific operating conditions, etc., it should be understood that the invention is not limited to such details since other modifications and variations in the system and in the operating conditions will be apparent to those skilled in the art from the above description.

I claim:

1. The process of converting hydrocarbons by contacting with suspended solid catalysts comprising effecting the desired contact between catalyst and hydrocarbon vapors at conversion temperature in a reaction zone, continually separating catalyst from hydrocarbon vapors in said reaction zone, conducting said separated catalyst downwardly from said reaction zone under the influence of gravity in a dense aerated stream in indirect heat exchange relation but out of contact with hot regeneration gases, discharging catalyst from the lower end of said stream into a subjacent regeneration zone isolated from said reaction zone, dispersing said catalyst within said regeneration zone and maintaining it in suspension therein, in contact with oxygen-containing regeneration gases whereby carbonaceous matter accumulated on said catalyst is removed by combustion, discharging the spent regeneration gases from said regeneration zone, collecting regenerated catalyst in the base of said regeneration zone, recycling said regenerated catalyst back to said reaction zone and withdrawing the products of the reaction from said reaction zone.

2. An apparatus for converting hydrocarbon oils by the aid of suspended solid catalysts which comprises a reaction zone superimposed on a regeneration zone and in indirect heat conducting contact therewith, means for introducing hydrocarbon vapors into said reaction zone, means for introducing catalyst into said reaction zone, a vapor line for discharging reaction products from said reaction zone, means for withdrawing catalyst from the base of said reaction zone, a vertically disposed elongated seal leading from the base of said reaction zone to said regeneration zone, means for maintaining a column of catalyst within said seal to prevent vapor communication between said reaction zone and said regeneration zone, means for discharging catalyst from said seal into said regeneration zone, means for introducing oxygen-containing gases into said regeneration zone, means for dispersing said catalyst in said regeneration zone, means at the bottom of said regeneration zone for collecting regenerated catalyst, means for recycling regenerated catalyst from said regeneration zone to said reaction zone, and an outlet for regeneration gases.

3. In the process of converting hydrocarbon oils by contacting their vapors at conversion temperatures with a powdered, solid conversion catalyst, wherein said catalyst is suspended in the oil vapors in an enlarged reaction zone, becomes deactivated by the deposition of carbonaceous deposits thereon, is separated from said hydrocarbon vapors, regenerated while dispersed in an oxygen-containing regeneration gas in an enlarged regeneration zone, separated from said regeneration gas and recycled back to said reaction zone for further contacting with said hydrocarbons, the improvement comprising conducting the dispersion, separation and transfer of catalyst from the reaction zone to the regeneration zone and back to the reaction zone with a minimum expenditure of energy by maintaining said reaction zone above said regeneration zone and at substantially the same pressure, conducting the catalyst from said reaction zone to said regeneration zone by the action of gravity, by flowing the catalyst from said reaction zone to said regeneration zone in a dense aerated stream thereby effecting a seal between the vapors in the reaction zone and the vapors in the regeneration zone.

4. The process of claim 3 wherein a body of catalyst is maintained in the base of said reaction zone, catalyst is withdrawn from said body to said regeneration zone and the rate of withdrawal of said catalyst is automatically controlled to prevent depletion of said catalyst body.

5. In the process of converting hydrocarbon oils by contacting their vapors at conversion temperatures with powdered, solid catalyst wherein said catalyst is suspended in the oil vapors in a reaction zone, becomes deactivated by the deposition of carbonaceous deposits thereon, is separated from said hydrocarbon vapors, regenerated while dispersed in an oxygen-containing regeneration gas, separated from said regeneration gas and recycled back to said reaction zone for further contacting with said hydrocarbons, the improvement comprising recycling the catalyst in the process with a minimum expenditure of energy and a minimum resistance to flow by superimposing said reaction zone on said regeneration zone, effecting the separation of catalyst from said hydrocarbon vapors and said regeneration gases by gravity within said zones, conducting the catalyst in a compact stream from the base of said reaction zone downwardly into said regeneration zone, dispersing catalyst in said regeneration zone by the action of a gas stream, maintaining a column of flowing catalyst in transit from said reaction zone to said regeneration zone and maintaining a pressure within said regeneration zone slightly higher than the pressure within said reaction zone but not exceeding the pressure exerted by said column of catalyst.

6. A catalytic hydrocarbon conversion system which comprises a reactor superimposed above a reactor standpipe, a regenerator superimposed above a regenerator standpipe, means for introducing hot hydrocarbon vapors into the lower part of the reactor but above the upper part of the reactor standpipe, means for introducing regenerated catalyst into the reactor whereby said introduced catalyst may be suspended in the introduced hydrocarbon vapors for effecting conversion, means for separating catalyst from reaction vapors leaving the top of said reactor and for returning said separated catalyst to a lower part of the reactor, means for aerating the catalyst in the bottom of the reactor and the reactor standpipe, means for introducing catalyst from the reactor standpipe into the lower part of the regenerator and for preventing regeneration gases from entering the reactor, means for introducing air at the lower part of the regenerator in such a manner as to disperse catalyst from the reactor standpipe as a suspended dense catalyst phase in the regenerator, means for separating catalyst from regeneration gases leaving the top of the regenerator and for returning said separated catalyst to the lower part of the regenerator, means for aerating catalyst in the bottom of the regenerator and the regenerator standpipe and means for introducing catalyst from the regenerator standpipe to the reactor.

7. The method of operating a hydrocarbon conversion system which comprises mounting a reaction zone immediately above an aerated catalyst zone whereby the pressure at the base of the reaction zone is superimposed on the aerated zone, mounting a regeneration zone above a second aerated catalyst zone whereby the pressure at the base of the regeneration zone is superimposed on that of the catalyst in the second aerated zone, introducing catalyst from the base of the second aerated zone into an intermediate part of the reaction zone, introducing hot hydrocarbon vapors into said reaction zone in such a manner as to form a dense turbulent catalyst suspension in said zone, separating catalyst from vapors leaving the top of said reaction zone and returning said separated catalyst to the lower part of said reaction zone, withdrawing spent catalyst from the bottom of said reaction zone through said first named aerated zone, introducing catalyst from the bottom of said first named aerated zone into the lower part of said regeneration zone, dispersing said catalyst with an oxygen-containing gas into said regeneration zone as a turbulent dense phase catalyst suspension, separating catalyst from regeneration gases leaving the top of the regeneration zone and returning the separated catalyst to a lower point in the regeneration zone, withdrawing regenerated catalyst from the bottom of the regeneration zone to said second aerated zone and returning catalyst from the bottom of said second aerated zone to said reactor.

8. The process of catalytically converting hydrocarbon oils which comprises introducing regenerated catalyst at a point in a reaction zone above the level of vapor inlet, introducing hydrocarbon vapors at a low point in said reaction zone at such a rate that the vertical vapor velocity in said zone will maintain a dense turbulent suspended catalyst phase above the point of vapor inlet, withdrawing spent catalyst from said reaction zone at a point below the vapor inlet, aerating said withdrawn catalyst for stripping hydrocarbon vapors therefrom and for maintaining the catalyst in fluent condition, introducing the withdrawn catalyst into the lower part of a regeneration zone, dispersing said catalyst in an oxygen-containing gas in said regeneration zone and introducing said gas at such a rate as to maintain a dense turbulent suspended catalyst phase in said zone, centrifugally separating catalyst from gases discharged from the regeneration zone and returning the separated catalyst to the lower part of said regeneration zone, withdrawing regenerated catalyst from a low point in said regeneration zone, aerating the withdrawn catalyst for stripping regeneration gases therefrom and maintaining the catalyst in fluent condition and returning the regenerated catalyst to said reaction zone.

9. The process of catalytically converting hydrocarbon oils which comprises introducing regenerated catalyst at a point in a reaction zone above the level of vapor inlet, introducing hydrocarbon vapors at a low point in said reaction zone at such a rate that the vertical vapor velocity in said zone will maintain a dense turbulent suspended catalyst phase above the point of vapor inlet, centrifugally separating catalyst from the reaction products discharged from the top of said reaction zone and returning said separated catalyst to the lower part of said reaction zone, withdrawing spent catalyst from said reaction zone at a point below the vapor inlet, aerating said withdrawn catalyst for stripping hydrocarbon vapors therefrom and for maintaining the catalyst in fluent condition, introducing the withdrawn catalyst into the lower part of a regeneration zone, dispersing said catalyst in an oxygen-containing gas in said regeneration zone and introducing said gas at such a rate as to maintain a dense turbulent suspended catalyst phase in said zone, withdrawing regenerated catalyst from a low point in said regeneration zone, aerating the withdrawn catalyst for stripping regeneration gases therefrom and maintaining the catalyst in fluent condition and returning the regenerated catalyst to said reaction zone.

10. The process of effecting catalytic conversion by means of a suspended solid catalyst which process comprises introducing an aerating gas into a stream of active catalyst to maintain said catalyst in aerated free-flowing condition, introducing said stream of catalyst into a reaction zone, introducing a charging stock stream at a low point in said reaction zone at such a rate that the vertical vapor velocity in said zone will maintain a dense turbulent suspended catalyst phase above the point of charging stock inlet, downwardly flowing spent catalyst directly from said dense catalyst phase into a relatively quiescent zone out of the path of the upflowing charging stock, downwardly flowing catalyst from said relatively quiescent zone as an aerated catalyst column, introducing an aeration gas at a low point in said column for maintaining the catalyst in fluent aerated condition, introducing catalyst from the base of said column into a regeneration zone, said column serving as a seal between said reaction zone and said regeneration zone, dispersing said catalyst in a regeneration gas and passing said gas upwardly in said regeneration zone at such a rate as to maintain a dense turbulent suspended catalyst phase in said zone, downwardly flowing regenerated cataylst from said dense turbulent catalyst phase into a relatively quiescent catalyst phase, downwardly flowing catalyst from said relatively quiescent catalyst phase to form said stream of active catalyst, removing conversion products from the upper part of said reaction zone and removing regeneration gases from the upper part of said regeneration zone.

11. In a process for effecting catalytic conversion of a charging stock at conversion temperature with a suspended solid catalyst wherein said catalyst is suspended in said stock in gaseous phase in a reaction zone, becomes deactivated, is separated from gasiform material, regenerated while suspended in a regeneration gas in a regeneration zone, separated from said regeneration gas and recycled back to said reaction zone for further contact with gaseous charging stock, the improvement which comprises recycling the catalyst in the process with a minimum expenditure of energy and a minimum resistance to flow by mounting one of said zones at a higher level than the other zone, introducing a first gaseous stream at a low point in the upper zone and removing the gaseous stream from the upper part of said zone, separating catalyst from the upflowing gaseous stream in the upper zone, downwardly withdrawing said separated catalyst from said zone as an aerated column, utilizing said column for effecting a seal between the upper and lower zones and for supplying pressure differential for introducing said cataylst into the lower zone, dispersing catalyst from the base of said column in a second gaseous stream, passing said second gaseous stream upwardly in the lower zone and removing it from an upper point thereof, separating catalyst from the gaseous stream in the lower zone, downwardly withdrawing catalyst therefrom and conveying said downwardly withdrawn catalyst by a gaseous stream back to said upper zone.

12. A process for the catalytic conversion of hydrocarbons which comprises introducing powdered catalytic material to a catalytic conversion zone, flowing vapors of the hydrocarbons undergoing conversion upwardly through said zone at a velocity adapted to form a dense turbulent phase of the catalyst particles in said zone, adding fresh powdered catalyst to said dense phase and withdrawing corresponding amounts of used catalyst therefrom at a rate adapted to maintain the average catalytic activity of said dense phase of catalyst particles at a suitable value, effecting said withdrawal of used catalyst from the conversion zone separate from the vaporous conversion products through a catalyst withdrawal passageway opening directly into the lower portion of said dense phase, continually introducing hot used cataylst thus withdrawn to a regeneration zone, flowing an oxygen-containing gas through said regeneration zone at a velocity adapted to form a dense turbulent phase of the catalyst in said zone, withdrawing regenerated catalyst from said regeneration zone separately from the gaseous regeneration products through a catalyst withdrawal passageway opening directly into the lower portion of said last mentioned dense phase, and continually returning the hot regenerated catalyst to the conversion zone.

13. In a contacting system wherein powdered solids are contacted with one stream of gases or vapors in a lower contacting zone and then contacted with another stream of gases or vapors in an upper contacting zone and wherein the contacting zones are defined by an arrangement of apparatus with one contacting chamber arranged above the other, the method of operation which comprises introducing a first stream of gases or vapors at a low point in the lower contacting zone, introducing finely divided solids from the upper contacting zone to the lower contacting zone in a downwardly moving column in dense phase aerated condition, suspending said powdered solids in said up-flowing first stream in said lower contacting zone, removing gases or vapors together with suspended solids from an upper part of said lower contacting zone, separating the removed solids from gases or vapors leaving said lower contacting zone and introducing said separated solids into the upper contacting zone, introducing a second stream of gases or vapors at a low point in the upper contacting zone at such a rate as to maintain a dense turbulent powdered solids suspension in said upper contacting zone, separating powdered solids downwardly from said dense phase suspension into an accumulation zone and discharging solids from said accumulation zone to said downwardly moving column.

14. The method of claim 13 wherein powdered solids consist essentially of a cracking catalyst, wherein the first gas or vapor stream consists essentially of hydrocarbon vapors wherein the lower contacting zone is a conversion zone, wherein the upper contacting zone is a regeneration zone and wherein the second stream of gases or vapors consists of a gas containing oxygen.

15. The method of claim 13 which includes the step of regulating the downward flow of solids in said column.

16. In a process for effecting contact of gasiform fluids with suspended solids of small particle size wherein the solids are suspended in a first gasiform fluid in a first contacting zone, separated from said first gasiform fluid, suspended in a second gasiform fluid in a second contacting zone, separated from the second gasiform fluid and recycled back to the first contacting zone for further contact with said first gasiform fluid, the improvement which comprises recycling the solids in the process with a minimum expenditure of energy and a minimum resistance to flow by disposing one of said zones at a higher level than the other zone, introducing the first gasiform fluid at a low point in the higher zone and removing a gaseous stream from the upper part of said zone, separating solids from said gaseous stream in the higher zone, downwardly withdrawing solids from said higher zone as an aerated column, utilizing said column for effecting a seal between the higher and lower zones and for supplying pressure differential for introducing said solids into the lower zone, introducing solids from the base of said column into the second gasiform stream, passing the second gasiform stream upwardly in the lower zone, separating solids from the second gasiform stream in the lower zone, removing the second gasiform stream from an upper point of said lower zone, downwardly withdrawing solids from the lower zone from a lower point in said zone than the point at which the second gasiform stream is removed therefrom, and conveying said downwardly withdrawn solids by a gaseous stream back to said higher zone.

FRED W. SCHEINEMAN.

REFERENCES CITED

The following references are of record in the file of this patent:

UNITED STATES PATENTS

| Number | Name | Date |
| --- | --- | --- |
| 1,475,502 | Manning | Nov. 27, 1923 |
| 2,239,801 | Voorhees | Apr. 29, 1941 |
| 2,247,097 | Menshih | June 24, 1941 |
| 2,248,196 | Plummer | July 8, 1941 |
| 2,264,438 | Gaylor | Dec. 2, 1941 |

FOREIGN PATENTS

| Number | Country | Date |
| --- | --- | --- |
| 533,037 | Germany | Sept. 18, 1931 |